United States Patent [19]

Miller et al.

[11] 4,415,600

[45] Nov. 15, 1983

[54] SPRAY DRIED COFFEE WHITENERS WITH REDUCED MILK PROTEIN

[75] Inventors: Donald E. Miller, Strongsville; Charles E. Werstak, Medina, both of Ohio

[73] Assignee: SCM Corporation, New York, N.Y.

[21] Appl. No.: 287,110

[22] Filed: Jul. 27, 1981

[51] Int. Cl.$^3$ ............................................. A23C 11/08
[52] U.S. Cl. .................................... 426/613; 426/658; 426/471
[58] Field of Search ........................ 426/613, 658, 471

[56] References Cited

U.S. PATENT DOCUMENTS

| | | | |
|---|---|---|---|
| 3,563,761 | 2/1971 | Ellinger | 426/567 |
| 3,958,033 | 5/1976 | Sims et al. | 426/602 |
| 4,025,659 | 5/1977 | Cho et al. | 426/613 |
| 4,045,589 | 8/1977 | Petrowski et al. | 426/609 |
| 4,046,926 | 9/1977 | Gardiner | 426/613 |
| 4,092,438 | 5/1978 | Tonner | 426/613 X |
| 4,239,786 | 12/1980 | Gilmore et al. | 426/613 X |
| 4,242,364 | 12/1980 | Buddemeyer et al. | 426/613 X |

FOREIGN PATENT DOCUMENTS 688859  6/1964  Canada ................................. 426/613

*Primary Examiner*—Robert A. Yoncoskie
*Attorney, Agent, or Firm*—Richard H. Thomas

[57] ABSTRACT

A dried coffee whitener comprising functional amounts of a hydrogenated vegetable oil, a casein-containing protein, a buffering agent, an emulsifying agent, the remainder being essentially carbohydrate, the improvement comprising employing as said emulsifying agent an ionic emulsifier such as sodium stearoyl-2-lactylate in combination with at least about 0.7% partial glycerol ester emulsifier.

8 Claims, No Drawings

SPRAY DRIED COFFEE WHITENERS WITH REDUCED MILK PROTEIN

The present invention relates to dried coffee whiteners, and particularly to a dried coffee whitener having a reduced protein content.

Coffee whiteners in the dried, liquid, or frozen form are well known. The present invention relates particularly to dried whiteners.

BACKGROUND OF THE PRESENT INVENTION

A typical formula for a dried coffee whitener is

| | |
|---|---|
| Hydrogenated vegetable fat or oil | 35% |
| Protein (e.g. sodium caseinate) | 5.25% |
| Buffering agent (e.g. $K_2HPO_4$) | 2% |
| Emulsifier, (e.g. mono- diglyceride) | 2.5% |
| Carbohydrate, (e.g. 24 D.E. corn syrup solids) | 55.25% |

A good dry coffee whitener formulation is one which, on reconstitution in coffee, forms a stable emulsion wherein the particle size of the fat or oil in the emulsion is about 1—3 microns in diameter. This provides a whitening effect, produced primarily as a result of light reflected from the surface of the finely emulsified fat globules. The carbohydrate acts as a carrier for the fat to retard coalescence of the fat and provides some sweetness effect. Emulsifiers such as mono- and diglycerides, diacetyl tartaric acid esters of mono- and diglycerides, propylene glycol monostearate, lecithin, and the like, have in the past been incorporated in the formulation to maintain the fat globules in dispersion. The protein, such as sodium caseinate, or soybean protein, has been found to be necessary to stabilize the emulsion through the drying step so that when the dried product is reconstituted in coffee, a stable emulsion is provided. The protein encapsulates the oil or fat droplets and binds water, thus preventing separation of the fat and coalescence of the droplets to form fat globules on the surface of the hot coffee. Normally, the protein is present in an amount of about 5% to 10%.

In formulations which contain protein, it is also common to include in the product stabilizing salts such as sodium citrate, tetrasodium pyrophosphates, etc., to improve the colloidal dispersibility of the protein and prevent what is termed "protein feathering" or precipitation of the protein due to acidity of the drink to which the whitener is added.

The protein usually employed in dried coffee whiteners is sodium caseinate. However, casein is milk derived and becoming scarce and expensive. Moreover, while sodium caseinate is legally defined to be a non-dairy material, its inclusion may make the product unacceptable to some ethnic groups.

There have been several attempts to replace sodium caseinate with other water dispersible proteins such as soy protein, but these have all been less than satisfactory. This is due to off-flavors, feathering of the protein in coffee, fat separation, poor whitening properties, and other problems. In fact, experience with other proteins, or with reduced amounts of caseinate in dried whiteners, has consistently been so unsatisfactory that any success in this respect can be deemed to be nothing short of surprising.

In prior U.S. Pat. No. 4,045,589, to Petrowski et al, it is proposed to eliminate the protein in a dried fat emulsion product by incorporating in the formulation a chemically modified dextrinized starch having a lipophilic character. The patent reports that such chemically modified starches were found to be effective in maintaining a stable emulsion subsequent to drying the liquid emulsion concentrate, eliminating the need for protein. Specifically, the patent proposed a formulation comprising vegetable fat or oil, carbohydrate, emulsifier, and the chemically modified dextrinized starch having a lipophilic character. The emulsion concentrate prior to drying had a pH below about 4.0.

A similar disclosure is contained in prior U.S. Pat. No. 3,563,761, which teaches the use of lactalbumin phosphate as a replacement for sodium caseinate.

In prior U.S. Pat. No. 4,025,659 to Cho et al, the problem of soy protein isolate feathering is said to be overcome by maintaining a predetermined ratio of caseinate to soy protein isolate, the combined proteinaceous content from the soy protein and caseinate being about 10% by weight based on the dry weight of the coffee whitener formulation. Specifically, the formulation contains sugar, fat, stabilizing salt, emulsifier, and proteinaceous ingredient, the casein providing at least about 0.9% by weight (dry basis) of the whitener composition.

U.S. Pat. No. 3,958,033 to Sims et al describes a protein-free clear fluid emulsion concentrate said to be shelf stable and useful as a coffee whitener. Critical ingredients, for instance in Example 4 of the patent, were sucrose (46.6%), fat (25%), water (23.4%), and sodium stearoyl-2-lactylate (5%). An adjunct emulsifier, for instance propylene glycol monostearate, may also be present. The disclosure of this patent is limited to liquid coffee whiteners. It is believed that the stability of the emulsion is primarily attributable to the large amount of sugar employed and viscosity of the emulsion by virtue of the sugar. A consumer could well find the sweetness level of the coffee whitener to be objectionable. Further, the amount of sodium stearoyl-2-lactylate required is well above the legal limit* permitted for this ingredient in coffee whiteners. Finally, dried and liquid coffee whiteners are very different in character and the experience obtained with one generally is not transferable to the other.

*Established at 0.3% basis total formulation, wet or dry, by the Food & Drug Administration, 21 Code of Federal Registry, part 172.846 (3)

Copending application Ser. No. 254,467, assigned to assignees of the present application, describes a non-dairy fluid coffee whitener adapted to be added to an acidic, hot environment, prepared by pasteurizing and homogenizing a water-rich lipoidal emulsion consisting essentially of about 6–15% edible fat, about 0.6–1.5% lipoidal emulsifier, and water, the emulsifier comprising about 0.3–1.05% of a low HLB mono- and diglyceride component or a propylene glycol ester and about 0.1–0.45% hard, ionizable lipoidal emulsifier component selected from the group consisting of sodium or calcium lactylated esters of fatty acids and sodium stearyl fumarate, the coffee whitener being protein free.

BRIEF DESCRIPTION OF THE PRESENT INVENTION

The present invention resides in the discovery that a dried coffee whitener suitable for addition to an acidic, hot environment can be prepared from a formulation comprising functional amounts of a hydrogenated vegetable oil, a casein-containing protein, and a buffering agent; further including at least 1% of an emulsifying agent; the remainder being essentially carbohydrate; said emulsifying agent being a blend of about 0.1–0.3% by weight of the formulation, dry basis, of an ionic emulsifier selected from the group consisting of sodium or calcium lactylated ester of fatty acids and sodium stearyl fumarate in combination with about 0.7–3% partial glycerol ester emulsifier, based on the weight of the formulation, dry basis.

A preferred formulation in accordance with the concepts of the present invention comprises about 2.5% emulsifying agent comprising partial glycerol ester and sodium stearoyl-2-lactate in the proportion of about 7.3:1.

In the practice of the present invention, the functionality of dried whiteners is measured by the appearance of hot coffee containing the whitener, and the whitening effect in hot coffee. Specifically, the whitening effect is measured in a reflectance spectrophotometer such as the Agtron Solid State Reflectance Spectrophotometer, Model M-400A, (trademark Magnuson Engineers, Inc.) using a green light filter and adjusted with discs 7 and 44. The usual reading for commercially prepared top-quality whiteners is about 40 Agtron units. Laboratory data shows that under similar settings, a differential greater than 5 Agtron units is necessary to be visible to the eye. A value about 35, preferably above about 37, is deemed to be acceptable in accordance with the concepts of the present invention.

By the present invention, the amount of sodium caseinate can be reduced by as much as 60% of that normally required in dried coffee whitener formulations. Good results are obtained by replacing up to 60% of the sodium caseinate with soy protein, which can be either soy protein isolate, soy protein concentrate, or modified soy flour.

These results are achieved without coalescence of the fat globules, when the whitener is added to an acidic, hot environment such as hot coffee, and also without protein feathering. Although not bound by any particular theory, it is believed that this is due to a unique combination of factors; namely concentrations, dry basis, of the lipid ingredients and the combination of specific lipid ingredients stated.

If desired, the emulsifier blend of the present invention can be supplemented by relatively small amounts of one or more high HIB emulsifiers such as high HLB polyglycerol esters and polysorbate. Specific examples are triglycerol monostearate (Santone 3-1-S, trademark SCM Corporation), octaglycerol monooleate (Santone 8-1-O, trademark SCM Corporation), polysorbate 60, and polysorbate 80.

In addition to the above ingredients, which for purposes of the present application may be considered the functional ingredients, the coffee whitener of the present invention may also contain non-functional ingredients such as flavoring, preservatives, anti-caking agents, and the like.

Advantages of the present invention should be apparent. A principal advantage is that the coffee whitener of the present invention, having reduced protein, is less expensive than conventional dry coffee whiteners.

DETAILED DESCRIPTION OF THE PRESENT INVENTION

Preferred low HLB partial glycerol ester emulsifiers of the present invention are partial fatty acid esters of glycol and propylene glycol having an HLB value not substantially greater than about 5 and a Capillary Melting Point sufficiently high to have a normally hard consistency at room temperature of about 70° F. Emulsifiers falling within this category are mono- and diglycerides which are in normally solid form. One such mono- and diglyceride is Dur-em 117 (trademark SCM Corporation), having an HLB value of about 2.8, made from 5 max. IV hydrogenated soybean oil, having a Capillary Melting Point of about 145°–150° F. and 40% minimum alpha-monoglyceride content. This emulsifier is marketed with an amount of citric acid to help protect flavor.

Another such mono- and diglyceride is Dur-em 127 (trademark SCM Corporation), marketed in white bead form, having an alpha-monoglyceride content of 40% minimum, an IV of 5 max. and a Capillary Melting Point of about 140°–145° F. A third such emulsifier is Dur-em 207, sold in white bead or flake form, having an alpha-monoglyceride content of 52% minimum, an IV of 5 max, and a Capillary Melting Point of about 140°–146° F. Both Dur-em 127 and Dur-em 207 are marketed with an amount of citric acid to help protect flavor.

A suitable propylene glycol ester is Durpro 107 (trademark SCM Corporation), marketed in flake form, having a propylene glycol mono- and diester content of about 50–60%, a monoglyceride content of about 10–15%, and a Capillary Melting Point of about 115°–125° F. This emulsifier has an HLB value of about 2.2.

The above emulsifiers are normally hard, making them convenient to use. However, a soft or plastic emulsifier can also be used, for instance Dur-em 114 (trademark SCM Corporation), a plastic mono- and diglyceride having about 40% minimum mono- content, an IV of 70–75, and a Capillary Melting Point of about 110°–120° F. Also useful is glycerol monooleate (GMO), marketed by Emery Industries under the trademark Emrite 6009, comprising mono- and diglycerides of food grade oleic acid having an IV of at least 60, at least 46% alpha-monoglyceride, less than 7% free glycerine and 9.5% propylene glycol. A similar composition is Atmos 300, marketed by ICI United States, Inc.

The partial glycerol ester emulsifier can also be a distilled monoglyceride such as Myverol 18-06 and 18-85 (trademarks Eastman Chemical), containing about 90% monoglyceride, The ionizable emulsifier component of the present invention is a normally solid, crystalline emulsifier component selected from the group consisting of an alkali or alkaline earth metal salt of an acyl lactylate and sodium stearyl fumarate. The two most common acyl lactylates are sodium and calcium stearoyl-2-lactylate, known as "Emplex" and "Verv" (trademarks, C. J. Patterson Co.), described in U.S. Pat. No. 2,733,252. Both are also described in Food Chemicals Codex, Second Edition, 1972, National Academy of Sciences, on Pages 160 and 770, and can be prepared by admixing lactic acid in an aqueous medium with commercial stearic acid (an admixture of myristic, palmitic and stearic fatty acids) at a sufficiently elevated temperature to cause a condensation reaction to occur. Other examples of the sodium stearoyl-2-lactylate are "Artodan SP 50" marketed by Grinstead Corp. and "Stearolac S450" marketed by The Paniplus Company. Specific procedures for producing the lactylates, of which the number 2 indicates the average number of lactyl groups on the molecule, are set forth in U.S. Pat. No. 2,789,992, insofar as the sodium stearoyl-2-lactylate ester is concerned, and the aforementioned U.S. Pat. No. 2,733,252, which describes both the preparation of sodium stearoyl-2-lactylate from stearic acid, sodium hydroxide, carbonate or bicarbonate and lactylic acid, and also sets forth the parameters for the production of the calcium lactylate composition.

Particular reference can be had to the Food and Drug Administration Regulation Title 21, Section 121.1211, on sodium stearoyl-2-lactylate. This compound is said to be a mixture of sodium salts of stearoyl lactylic acid and minor proportions of other sodium salts of related acids, manufactured by the reaction of stearic acid and lactic acid and conversion to the sodium salts. This emulsifier meets the following specifications:

Acid Number: 60–80
Sodium Content: 3.5–5%
Lactic Acid Content: 31–34%
Ester Number: 150–190

A critical ingredient in the present invention is a buffering agent to hinder protein feathering. Such an agent preferably is a buffering salt capable of raising the pH of the coffee or tea product to which the whitener is added to counteract the acidity of the product and assist the colloidal dispersibility of the protein. One suitable such buffering agent is dipotassium phosphate ($K_2HPO_4$). Other such agents include sodium and potassium salts of acids such as citric acid and ortho, meta or polyphosphoric acid. Other specific examples are disodium phosphate and sodium polyphosphate.

A preferred fat useful in the present invention is a partially hydrogenated 5 max. IV coconut oil marketed by SCM Corporation under the trademark Hydrol 100. This fat has a Wiley Melting Point in the range of 98°–102° F., a free fatty acid content of 0.05% (maximum), and a minimum AOM of 100. The SFI data for Hydrol 100 is as follows:

| Temperature °F. | Approx. Solid Fat Index |
|---|---|
| 50 | 61–67 |
| 70 | 38–44 |
| 80 | 11–17 |
| 92 | 3–7 |
| 100 | 0–2 |

Another fat which can be used in the present invention is a non-lauric fat (that is, one having a low lauric acid content—$C_{12}$) which is hydrogenated and elaidinized to provide a desired hardness or high solids content sufficient to maintain a substantially plastic consistency throughout a wide temperature range, and at the same time a rapid melting at elevated temperatures above about 110° F. without retention of a waxy mouth feel.

One suitable such elaidinized fat is a partially hydrogenated vegatable oil (cottonseed or soybean) marketed under the trademark Duromel, (SCM Corporation) having an IV of 60–65, a Wiley Melting Point of 101°–115° F., and a solid fat index of:

| Temperature °F. | Approx. Solid Fat Index |
|---|---|
| 50 | 56 |
| 70 | 43 |
| 80 | 36 |
| 92 | 16 |
| 100 | 4 max. |

Duromel has a free fatty acid content of 0.1 max.

Another suitable such fat that can be used in the composition of the present invention is a partially hydrogenated vegetable oil (cottonseed or soybean) marketed under the trademark Kaomel (SCM Corporation) having a Wiley Melting Point of 97°–101° F., an IV of 59, and a solid fat index as follows:

| Temperature °f. | Approx. Solid Fat Index |
|---|---|
| 50 | 72 |
| 70 | 63 |
| 80 | 55 |
| 92 | 21 |
| 100 | 3 max. |

Wiley Melting Point is determined by AOCS method Cc-2-38. The approximate solid fat index is determined by AOCS method Cd-10-57.

Another suitable oil useful in the present invention is coconut oil marketed by SCM under the trademark Konut. This oil has a Wiley Melting Point of 75°–80° F., an AOM value of 100 hours minimum, and a free fatty acid content of 0.05% maximum.

Still another fat useful in the present invention is a partially hydrogenated oil selected from the group consisting of coconut, palm kernel, palm, soybean and cottonseed, marketed under the trademark Paramount X by SCM Corporation, the fat having a Wiley Melting Point of 112°–114° F. and SFI data as follows:

| Temperature °F. | Approx. Solid-Fat Index |
|---|---|
| 50 | 67 |
| 70 | 56 |
| 80 | 40 |
| 92 | 26 |
| 100 | 13 |
| 110 | 6 |

Still one additional fat that may be employed is butterfat which typically has a Wiley Melting Point of about 95° F., an IV of about 31.4, a $C_{16}$ or lower content of about 50%, and an SFI as follows:

| Temperature °F. | Approx. Solid-Fat Index |
|---|---|
| 50 | 33 |
| 70 | 14 |
| 80 | 10 |
| 92 | 3 |
| 100 | 3 |

Butterfat-containing fluid whiteners may have a shelf life somewhat less than those containing a hudrogenated and/or elaidinized fat.

In addition to the above ingredients, the coffee whitener of the present invention contains a carbohydrate to add bulk and sweetness, if desired, to the formulation. A preferred such carbohydrate is corn syrup solids, although many other carbohydrates such as fructose, sugar, and the like, can be used as is well known in the art. The formulation can also contain such additional additives as BHA, BHT, citric acid and the like, as preservatives, and artificial sweeteners such as saccharin. Such ingredients, other than the carbohydrate, are considered non-functional additives in the present invention. Normally, they would be employed in small amounts to add the same sweetness level as exists in ordinary dairy cream or conventional non-dairy coffee whiteners. In addition, flavorants such as vanillan or butter or cream flavoring can be added, as well as colorants, including titanium dioxide.

The proportions of ingredients in the formulation of the present invention are critical. The amount of oil or fat used should be a whitening amount and generally will be in the percentage of about 25-50%, based on the dry weight of the formulation. Particularly good results are obtainable with an oil or fat content of about 35-50%. The amount of protein (sodium caseinate) employed should be a stabilizing amount. In the present invention, this will be about 2.5%-5.5%, dry weight basis, total formulation. There is no particular upper limit other than one based on practicality, and the need for functional amounts of other ingredients, except that it is an object of the present invention to reduce the sodium caseinate content, and effective results are obtained with, again, as much as a 60% reduction in the sodium caseinate content over that conventionally used. The amount of buffering agent employed is that necessary to inhibit protein feathering. Generally, this will be about 40% of the protein content, or about 2% of the total formulation, dry weight basis.

The amount of emulsifying agent employed should be at least about 1%, dry weight basis, total formulation, a preferred amount being about 2.5%. As stated, the emulsifying agent is a blend of about 0.1-0.3% ionic emulsifier component and about 0.7-3% partial glycerol ester.

In preparing the product of this invention, a liquid emulsion concentrate is formed prior to the drying step by dissolving and/or dispersing the various dry ingredients in enough water to maintain the solids in solution or dispersion and provide sufficient fluidity to the concentrate so that it may be pumped. The dissolved and dispersed solids of the liquid emulsion concentrate are usually in the range of 50%-70%. Generally, in preparing the emulsion concentrate, the fat is heated to about 130° F.-140° F. and the emulsifier is added to the liquified fat. The protein, carbohydrate, and buffering agents are added, with agitation, to water having a temperature of room temperature to 140° F., to disperse or dissolve them. The water phase and fat phase are then mixed and homogenized to provide a stable emulsion in which the fat particles average about 1-3 microns in diameter. This liquid emulsion concentrate is then dried to a moisture content preferably not in excess of about 3%. While the liquid emulsion concentrate preferably is spray dried, other drying procedures may also be used, such as freeze drying, drying on heated drums, etc.

Improved whitening can also be obtained by replacing an amount of the sodium caseinate, up to 60%, with a soy protein derivative such as soy protein isolate. Soy protein isolate, for instance Supro 710, trademark Ralston-Purina Co., contains about 93% protein, dry basis. However, it was also found that the functional properties of the coffee whitener could be obtained by partial replacement of the sodium caseinate with other soy protein derivatives than the isolate. For instance, it was found that good results could be obtained with soy protein concentrate (Sta-pro 3200, trademark A. E. Staley Co.) having 68-69% protein, dry basis, or even with modified soy flour (Cargil, Inc.) having only 55% protein.

EXAMPLE I

A typical formula for dried coffee whitener is

| Ingredient | Percent |
| --- | --- |
| Hydrol 100 (trademark, SCM Corp.) | 35 |
| Sodium caseinate | 5.25 |
| $K_2HPO_4$ | 2 |
| Dur-em 207 (trademark, SCM Corp.) | 2.50 |
| 24 DE Corn syrup solids | 55.25 |

The above formulation was processed with 0, 20, 40 and 60% less sodium caseinate. The difference in total weight was compensated for by equivalent increases in the corn syrup solids.

The coffee whitener was prepared by the above described procedure. Specifically, the dry ingredients, including protein, carbohydrate and buffering agent, first were dispersed or dissolved in water heated to about 130°-140° F. The amount of water used was equal to the weight of other ingredients in the formulation. The fat was melted and the emulsifier blend was added to it, following which the lipid blend was added to the heated water mix. The entire mix was then further heated to about 160° F. and held at this temperature for about fifteen minutes to pasteurize the same. The slurry was then homogenized at about 2500/500 psi in a two-stage homogenizer, following conventional dairy technology, and subjected to spray drying in a Bowen Spray Drier, using standard inlet and outlet temperatures for drying dairy products.

Agtron readings on the above whiteners in hot coffee were:

TABLE I

| Percent Reduction | Agtron reading |
| --- | --- |
| 0 | 40 |
| 20 | 37 |
| 40 | 36 |
| 60 | 31 |

Higher Agtron readings indicate better whitening effect. The 31 reading at 60% reduction was significantly inferior to the 0 reduction control. A reading of 36 at 40% reduction was considered to be borderline. The reading of 37 at 20% reduction in protein was not as good as control, but was acceptable, indicating that even with conventional emulsifiers some reduction in protein content is possible.

Similar whitener samples were prepared containing two emulsifier blends, in the amount of 2.5% by weight, dry basis, of the total coffee whitener formulation, as follows:

| | |
| --- | --- |
| Blend 1 | 70% mono-diglyceride (Dur-em 117) |
| | 30% sodium stearoyl-2-lactylate |
| Blend 2 | 28% mono-diglyceride (Dur-em 117) |
| | 60% mono-diglyceride (Dur-em 207) |
| | 12% sodium stearoyl-2-lactylate |

Agtron readings in coffee whiteners containing these blends were as follows:

TABLE II

| Percent reduction Sodium Caseinate | Blend 1 | Blend 2 |
| --- | --- | --- |
| 0 | 37 | 37 |
| 20 | 37 | 37 |
| 40 | 37 | 38 |

TABLE II-continued

| Percent reduction Sodium Caseinate | Blend 1 | Blend 2 |
|---|---|---|
| 60 | 35 | 35 |

All of the above readings were acceptable compared to the 0% reduction control. This result was unexpected and demonstrates the unique properties of the combination of mono-diglyceride with sodium stearoyl lactylate.

In this example, the levels of emulsifier, dry basis, in the formulation were as follows:

TABLE III

| Ingredient | Blend 1 | Blend 2 |
|---|---|---|
| Dur-em 117 | 1.75% | .7% |
| Dur-em 207 | | 1.5% |
| Sodium stearoyl-2-lactylate | .75% | .3% |

From the above, it is apparent that the amount of sodium stearoyl-2-lactylate present in Blend 1 is above the legal limit permitted for this ingredient. It is significant that even at the 0.3% level (Blend 2), effective results are obtained. However, it is important that a minimum amount of the mono-diglyceride be present with the sodium stearoyl-2-lactylate. In a series of tests conducted using 0.3% sodium stearoyl-2-lactylate and only 0.7% mono-diglyceride (Dur-em 117) the following results were obtained:

TABLE IV

| Percent reduction Sodium caseinate | Agtron Reading |
|---|---|
| 0 | 36 |
| 20 | 35 |
| 40 | 35 |
| 60 | — |

Based on this and other data, it has been determined that although the mono-diglyceride content can be as little as 0.7%, a preferred amount is at least about 1.7% (with 0.3% ionic emulsifier), the best results being obtainable with about 2.2% mono-diglyceride and 0.3% ionic emulsifier.

EXAMPLE II

Similar unexpected results were obtained when soy protein derivatives (soy flour) were substituted, in three samples, for 20, 40 or 60% of the sodium caseinate, using the formula of Example I. The samples also contained 2.5% of the emulsifier Blend 2 of Example I. Agtron readings in hot coffee were obtained as follows:

TABLE V

| Percent substitution of sodium caseinate by soy flour | Agtron Reading |
|---|---|
| 20 | 40 |
| 40 | 40 |
| 60 | 36 |

The above tests of Example II were repeated using Dur-em 204(Note 1) as the source of monoglyceride as follows:

(Note 1) Trademark SCM Corporation, a mono-diglyceride having an alpha monoglyceride content of about 50–55%, an IV of about 65–75 and a Capillary Melting Point of about 120°–130° F.

Blend 3 { 2.2% mono-diglyceride (Dur-em 204)
0.3% sodium stearoyl-2-lactylate

The following Agtron readings were obtained:

TABLE VI

| Percent substitution with soy flour | Agtron Reading |
|---|---|
| 20 | 39 |
| 40 | 39 |
| 60 | 35 |

EXAMPLE III

Supplemental emulsifiers in addition to mono-diglyceride and sodium stearoyl lactylate can be used. Additional laboratory evaluations showed that octaglycerol monooleate (Santone 8-1-O, trademark SCM Corporation) can be used to improve the appearance of whitener in hot coffee by reducing the normal visual flotation of fat(Note 2) and/or proteinaceous material. In several samples of whiteners containing 40% substitution of sodium caseinate with soy protein isolate, the following observations were made:

(Note 2) Even with the use of cream to whiten coffee, there usually is some visual flotation of fat.

TABLE VI

| Lipid Blend | Appearance of flotation material |
|---|---|
| Blend A: | |
| 1% CW-6 (Note 3) | some |
| 1.5% Dur-em 207 | |
| 0.25% Santone 8-1-0 | |
| Blend B: | |
| 1% CW-6 (Note 3) | + none |
| 1.5% Dur-em 207 | |
| 0.5% Santone 8-1-0 | |
| Blend C: | |
| 1% CW-6 (Note 3) | + none |
| 1.5% Dur-em 207 | |
| 0.75 Santone 8-1-0 | |
| Blend D: | |
| 1% CW-6 (Note 3) | + none |
| 1.5% Dur-em 207 | |
| 1% Santone 8-1-0 | |

(Note 2) Even with the use of cream to whiten coffee, there usually is some visual flotation of fat.
(Note 3) 70% mono-diglyceride (Dur-em 117) 30% sodium stearoyl-2-lactylate The above tests show that with the use of a small amount of adjunct emulsifier (high HLB) in combination with the emulsifier blend of the present invention, the usual visual flotation of fat can be totally eliminated.

Other high HLB(Note 4) esters such as polysorbate 60, polysorbate 65, polysorbate 80, Santone 3-1-S, and the like, will have a similar effect as Santone 8-1-O.
(Note 4) HLB above 7. Typical valves are:

| Ingredient | HLB |
|---|---|
| Santone 8-1-0 | 13–16 |
| Santone 8-1-S | 7.2 |
| Polysorbate 60 | 14.9 |
| Polysorbate 80 | 15–16 |
| Polysorbate 65 | 10.5 |

What is claimed is:

1. A dried coffee whitener comprising on a dry weight basis
   about 25-50% of a vegetable oil which is normally solid at room temperature;
   about 2.5-5.5% of a casein-containing protein;
   a buffering agent in an amount effective to prohibit feathering;
   at least about 1% of an emulsifying agent for improved whitening;
   the remainder being essentially carbohydrate;
   said emulsifying agent being a blend consisting essentially of a partial glycerol ester which is normally hard or plastic at room temperature and an ionic emulsifier selected from the group consisting of sodium or calcium lactylated esters of fatty acids and sodium stearyl fumarate, said partial glycerol ester and ionic emulsifier being present in the amounts of about 0.7—3% and about 0.1-3%, respectively, based on the dry weight of the formulation.

2. The coffee whitener of claim 1 having an Agtron reading of at least about 35 as measured by an Agtron Solid State Reflectance Spectrophotometer, Model M-400A, using a green light filter and adjusted with discs 7 and 44.

3. The coffee whitener of claim 2 containing at least about 1.7% partial glycerol ester emulsifier based on the dry weight of the formulation.

4. The coffee whitener of claim 3 wherein said vegetable oil is partially hydrogenated coconut oil, said oil having a Wiley Melting Point in the range of about 98°-102° F.

5. The coffee whitener of claim 1 prepared by first forming an emulsion of the ingredients thereof, homogenizing said emulsion, and then spray drying the homogenized emulsion.

6. The coffee whitener of claim 1 further including supplemental amounts of soy protein derivatives selected from the group consisting of soy flour, soy protein isolate, and soy protein concentrate present in the proportion of 0-150% based on the casein-containing protein weight.

7. The coffee whitener of claim 6 wherein said casein-containing protein is sodium caseinate.

8. The coffee whitener of claim 1 further including amounts of emulsifier having an HLB above about 7.2 sufficient to inhibit flotation of fat globules when the coffee whitener is added to hot coffee.

* * * * *